Patented June 30, 1925.

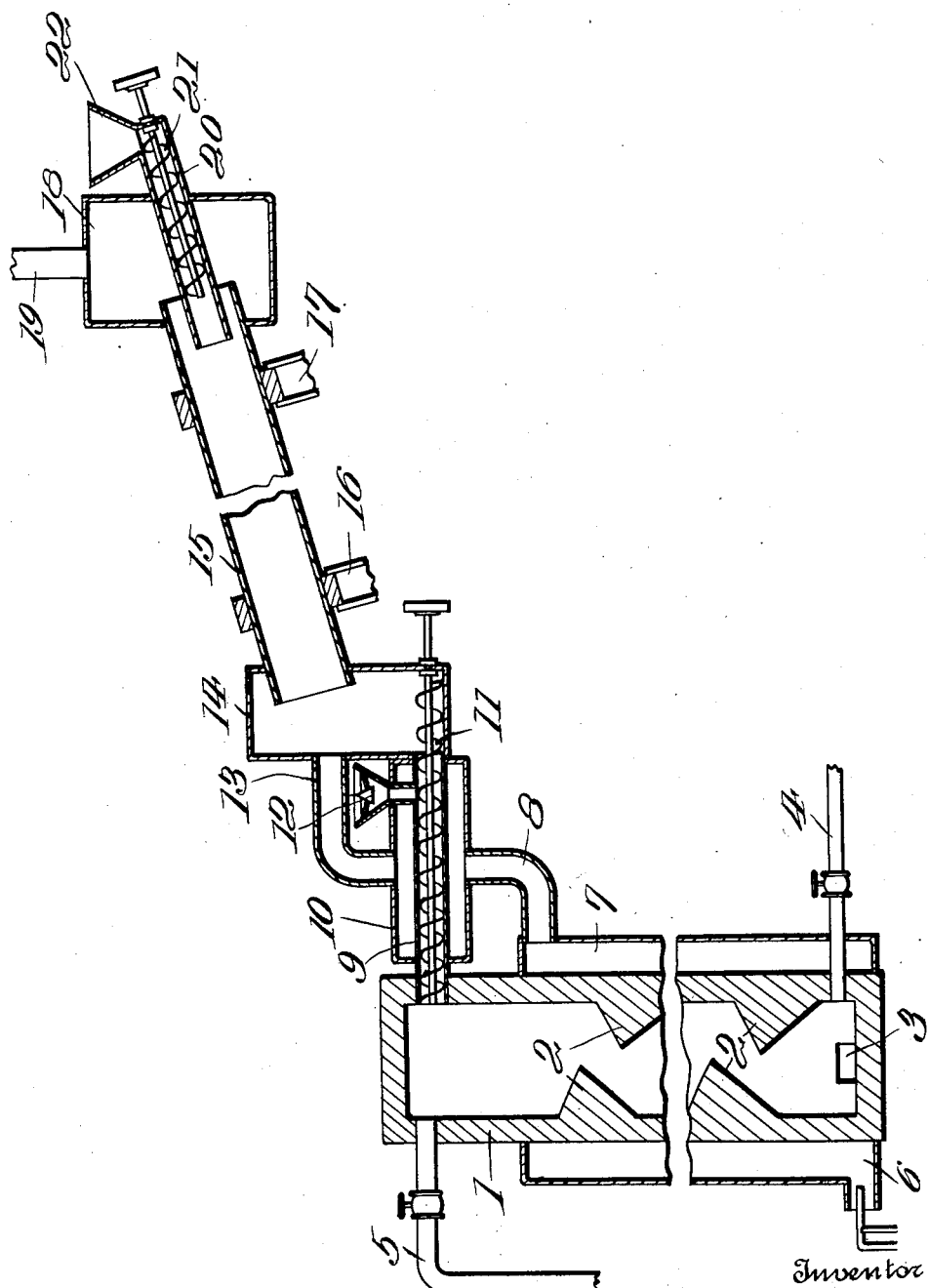

1,544,328

UNITED STATES PATENT OFFICE.

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS.

PROCESS OF MAKING ALUMINUM CHLORIDE.

Application filed January 25, 1922. Serial No. 531,612.

*To all whom it may concern:*

Be it known that I, ALMER McDUFFIE McAFEE, a citizen of the United States, residing at Port Arthur, in the county of Jefferson and State of Texas, have invented certain new and useful Improvements in Processes of Making Aluminum Chloride, of which the following is a specification.

This invention relates to processes of making aluminum chloride; and it comprises a method of making aluminum chloride from alumina (bauxite) and carbon (coke or charcoal) and chlorin with the aid of heat wherein the alumina and carbon are dehydrated and activated by a preliminary heating, usually around 700° F. and usually by direct contact with fire gases carrying but little free oxygen and are thereafter exposed to the action of chlorin at the requisite temperature, heating being sometimes aided by the presence of aluminous bodies capable of exothermic reaction with chlorin, such as metallic aluminum (aluminum dross); all as more fully hereinafter set forth and as claimed.

Aluminum chloride has long been made by exposure of a hot mixture of alumina and carbon to the action of gaseous chlorin. Vapors of aluminum chloride are made and separated by condensation from the accompanying oxids of carbon formed from the carbon and the oxygen of the alumina by a well known reaction. While this manufacture is simple enough in theory, it is attended with considerable difficulty in practice; these difficulties being largely due to slow reactivity in the materials. This necessitates work at a relatively high temperature in order to quicken the action and as the operation, like any other in which solids are converted into vapors and gases, consumes considerable heat, much heat must be delivered to the sphere of reaction at a high temperature plane, creating apparatus troubles.

I have discovered that the manufacture can be considerably simplified and quickened by the expedient of presenting the materials to the chlorin in a more reactive condition.

Bauxite is the cheapest commercial form of alumina. It may be considered as a more or less impure form of aluminum hydrate; a chemical combination of aluminum oxid with water of hydration. This water is held with considerable tenacity and though it may be quickly expelled by a high heat, as is the regular practice, in so doing the alumina is shrunk and hardened and rendered much less reactive with chemicals, including chlorin. I have found that by prolonged heating at a comparatively moderate temperature, and particularly when exposed to a changing atmosphere to carry away the water vapor as fast as liberated, the water can be as effectually expelled without this deleterious change occurring. Ordinarily, I use a temperature around 700° F. Under these conditions the water is removed without, so to speak, injuring the chemical activity of the aluminum oxid; the bonds or chemical valences which held the water molecules are still in existence. Alumina so dehydrated, readily takes up chlorin or any other chemically active gas by "adsorption"; it is a highly adsorptive, readily reactive material. Exposed to an atmosphere of chlorin, it condenses or takes up a considerable volume of the gas, holding it in a condition to make it available for making aluminum chloride. The water being removed from the alumina without any substantial shrinkage or condensation of the same, the alumina is left in a highly pervious or porous condition, presenting a large area of adsorptive surface.

In a similar way, carbon as coke or charcoal holds considerable amounts of condensed gases and vapors, including water, as well as oxygen. Whether this oxygen is present by adsorption or in the form of a complex suboxid of carbon is not certain and is here immaterial. From these gases and vapors it is also difficult to free the carbon by quick heating; but it may be done by a prolonged slow heating and the purification accelerated by exposure to a changing atmosphere. When so removed, the carbon is what is known as "activated"; it is in a readily reactive form and capable of adsorbing or taking up considerable volumes of gases, including chlorin.

In the present invention I take advantage of these facts and prior to exposing the bauxite and carbon to the action of the chlorin, I subject them to a prolonged heating at a comparatively low temperature, usually around 700° F., in a changing atmosphere. This is most readily done by passing the two, singly or in admixture, slowly down a rotary inclined tubular kiln against an opposed current of fire gases at the appropriate temperature. These gases, which should be free, or nearly so, of oxygen, may be derived from the furnace furnishing the heat for the production of aluminum chloride. As the solids pass slowly down through the kiln, their water, gases and vapors are given up and they are converted to a condition readily reactive with chlorin. They leave the apparatus at a temperature of about 700° F. and their heat is available in the reaction.

Heating of the activated bauxite and carbon with chlorin may be done in any of the usual forms of apparatus. Production of aluminum chloride is facilitated by developing some or much of the heat by exothermic action of chlorin on deoxidized forms of alumina; such as metallic aluminum, aluminum carbid, aluminum nitrid, etc., a certain amount of some such material being added to the activated bauxite and carbon.

In the accompanying illustration I have shown, more or less diagrammatically, certain apparatus embodying the described invention and capable of use in the performance of the described process. In this showing, the figure is a view in central vertical section, certain parts being shown in elevation.

In this showing, element 1 is a vertical reaction chamber provided with angled shelves 2 of the type of those used in a "shaft-and-shelf furnace"; these serving to produce a retarded flow of pulverulent material through the furnace. At the bottom is manhole 3 for removing solids unacted upon, such as coke ash, etc. Chlorin or chlorin containing gas with heated air or oxygen is introduced through conduit 4 and aluminum chloride vapors are removed at the top through conduit 5, being sent to a condensing plant (not shown). Heat is provided by furnace chamber 6 having heating flue 7 encircling the vertical retort. From this flue the fire gases, now reduced in temperature, pass through duct 8 and surround conduit 9 in heating casing 10. This conduit contains a mixing screw conveyor 11 and is provided with hopper 12 for the addition of metallic aluminum (which may be added as "aluminum dross"), aluminum carbid, etc. From this jacket, the fire gases, now still further reduced in temperature, pass through conduit 13, their temperature now being around 700° F. This conduit enters stationary housing 14 enclosing the lower end of rotary inclined kiln 15 provided with the usual driving and supporting means 16 and 17. At the upper end, the kiln enters stationary housing 18 provided with stack 19 and feeding conduit 20, containing a screw conveyor 21, and supplied with a mixture of carbon and bauxite from hopper 22.

The operation of this apparatus is obvious from the description. A mixture of coke and bauxite is delivered into the kiln by means of 22, 20 and 21, and passes down slowly therethrough against an opposing current of neutral fire gases entering at a temperature of about 700° F. The material in its slow passage down the kiln is dehydrated and activated in the manner described. From the lower end of the kiln it is taken by screw conveyor and passed through the heated conduit 9, where such amounts of exothermic bodies as may be desired may be added at 12. The mixture passes into the upright retort 1 and tumbles down therethrough against an opposing current of chlorin and oxygen-containing gas entering at 4. Solid residues are removed at 3, while aluminum chloride passes as vapor through 5 to a condenser (not shown).

Many other forms of apparatus than that shown may be employed in practicing the present invention; but the form shown is simple, operative and economical. I regard, however, my invention as covering any method of producing aluminum chloride from hydrated aluminum oxid, carbon and chlorin wherein the alumina and the carbon are freed of water, gases and volatiles by a prolonged heating at a comparatively low temperature; a temperature (not substantially above 700° F.) insufficient to shrink, harden and condense the alumina rendering it less active chemically.

What I claim is:—

1. In the manufacture of aluminum chloride from hydrated alumina, carbon and chlorin, the process which comprises subjecting the alumina to a prolonged heating in a changing atmosphere and at a temperature insufficient to produce any substantial shrinking and condensation of the alumina or destroy the natural porosity of dehydrated unshrunk alumina.

2. In the manufacture of aluminum chloride from carbon, alumina and chlorin, the process which comprises subjecting the carbon to a prolonged heating at a relatively low temperature in a changing atmosphere in such a manner as to clear and open its pores prior to subjecting the mixture of carbon and alumina to the action of chlorin.

3. In the manufacture of aluminum chloride from hydrated alumina, carbon and chlorin, the process which comprises subjecting the carbon and the alumina to an activating heating at a low temperature in a changing atmosphere, the temperature being insufficient to produce any substantial shrinking or condensation of the alumina or destroy the natural porosity of dehydrated unshrunk alumina and thereafter chlorinating the mixture.

4. In the manufacture of aluminum chloride from hydrated alumina, carbon and chlorin, the process which comprises passing a mixture of hydrated alumina and carbon slowly through an atmosphere of neutral fire gases, the temperature of such gases at the time of initial contact being about 700° F., and then passing the so activated materials through a heated conduit in contact with an opposing current of chlorin.

5. The herein described process of making aluminum chloride which comprises treating aluminum containing materials with chlorin in the presence of an activated carbon.

6. The process of making aluminum chloride which comprises treating bauxite with chlorin in the presence of an activated carbon.

7. The process of making aluminum chloride which comprises treating bauxite with chlorin at aluminum chloride making temperature in the presence of an activated carbon.

In testimony whereof, I have hereunto affixed my signature.

ALMER McDUFFIE McAFEE.